United States Patent
Dahiwadkar

(10) Patent No.: US 10,096,063 B2
(45) Date of Patent: Oct. 9, 2018

(54) OFFICE MANAGEMENT SOLUTION

(76) Inventor: Sanjeevkumar V. Dahiwadkar, Ellicott City, MD (US)

( * ) Notice: Subject to any disclaimer, the term of this patent is extended or adjusted under 35 U.S.C. 154(b) by 1541 days.

(21) Appl. No.: 12/589,755

(22) Filed: Oct. 28, 2009

(65) Prior Publication Data

US 2010/0106554 A1   Apr. 29, 2010

Related U.S. Application Data

(60) Provisional application No. 61/197,496, filed on Oct. 28, 2008.

(51) Int. Cl.
*G06Q 40/00* (2012.01)
*G06Q 40/02* (2012.01)
*G06Q 10/06* (2012.01)

(52) U.S. Cl.
CPC ............ *G06Q 40/02* (2013.01); *G06Q 10/06* (2013.01); *G06Q 40/00* (2013.01)

(58) Field of Classification Search
CPC ........ G06Q 40/00; G06Q 40/02; G06Q 10/00; G06Q 10/06; G06F 15/16
USPC .......................................................... 705/35
See application file for complete search history.

(56) References Cited

U.S. PATENT DOCUMENTS

| | | | | |
|---|---|---|---|---|
| 5,826,239 A * | 10/1998 | Du | ........................ | G06Q 10/06 705/7.26 |
| 6,324,654 B1 * | 11/2001 | Wahl | .................... | G06F 11/2066 707/999.202 |
| 6,529,960 B2 * | 3/2003 | Chao | ..................... | H04L 1/1809 370/394 |
| 6,643,625 B1 * | 11/2003 | Acosta | ............ | G06Q 10/06393 705/30 |
| 6,662,195 B1 * | 12/2003 | Langseth | .......... | G06F 17/30592 |
| 6,721,745 B2 * | 4/2004 | Monestere, III | .. | G06F 17/30442 |
| 6,785,721 B1 * | 8/2004 | Immerman | ............ | G06Q 10/10 709/220 |
| 6,898,574 B1 * | 5/2005 | Regan | .................... | G06Q 20/10 705/35 |
| 7,006,994 B1 * | 2/2006 | Campbell | ............ | G06Q 20/102 705/40 |
| 7,254,558 B2 * | 8/2007 | Hinkle | ................. | G06Q 20/102 235/379 |
| 7,860,781 B1 * | 12/2010 | Bodi | ....................... | G06Q 40/00 705/35 |
| 8,166,118 B1 * | 4/2012 | Borghetti | ................ | H04L 51/12 707/922 |
| 2001/0044773 A1 * | 11/2001 | Sellers | ................. | G06Q 40/025 705/38 |
| 2001/0056362 A1 * | 12/2001 | Hanagan et al. | ................. | 705/7 |

(Continued)

OTHER PUBLICATIONS

Title: Enterprise Service Oriented Architectures Authors: McGovern, James Date: 2006 pp. 435 (Year: 2006).*

Primary Examiner — Asha Puttaiah
Assistant Examiner — Yongsik Park
(74) Attorney, Agent, or Firm — Baker Donelson, PC; Royal W. Craig

(57) ABSTRACT

A software method and utility for business practice management based on a prescribed workflow with defined interactions between the users of the system, the clients of the business practice, and information relating to the clients or assets of the business practice. The system facilitates management of assets and human resources, including employees, client accounts, inventory, and records using a modular approach.

17 Claims, 8 Drawing Sheets

(56) References Cited

U.S. PATENT DOCUMENTS

| | | | |
|---|---|---|---|
| 2002/0073023 A1* | 6/2002 | Castro | G06Q 30/02 705/38 |
| 2003/0195765 A1* | 10/2003 | Sehgal | G06F 17/30557 705/1.1 |
| 2004/0138934 A1* | 7/2004 | Johnson | G06Q 10/06 705/7.36 |
| 2005/0025069 A1* | 2/2005 | Aysan | H04L 12/4641 370/254 |
| 2005/0086384 A1* | 4/2005 | Ernst | G06F 17/30 709/248 |
| 2005/0251420 A1* | 11/2005 | Dixon et al. | 705/2 |
| 2005/0278246 A1* | 12/2005 | Friedman | G06Q 40/025 705/38 |
| 2006/0235733 A1* | 10/2006 | Marks | 705/7 |
| 2007/0033252 A1* | 2/2007 | Combest | G06Q 10/10 709/204 |
| 2007/0143164 A1* | 6/2007 | Kaila | G06Q 10/06 705/301 |
| 2008/0183483 A1* | 7/2008 | Hart | 705/1 |

* cited by examiner

FIG. 7

Administrative Functions
- b51: My Preferences Module
- b52: Work flow Management Module
- b53: Messaging Module
- b54: Manual Diary Module
- b55: Contacts Rolodesk Module
- b56: Userlog Auditing Module
- b57: Reporting Module
- b58: Communication Mgmt Module
- b59: Data Import / Export Module
- b60: Backup / Restore Module
- b61: Masters Maintenance Module
- b62: System Administration Module
- b63: Utilities / Tools Module

Documents Management Functions
- b31: Dynamic Doc Generation Module
- b32: Faxing Management Module
- b33: email Management Module
- b34: Doc workflow Management Module
- b35: Document Archival Module
- b36: Document Processor

Case Management Functions
- b01: Foreclosure Module
- b02: Bankruptcy Module
- b03: Eviction Module
- b04: Litigation Module
- b05: Loss Mitigation Module
- b06: CCCS Module
- b07: Mortgage Insurer Module
- b08: Servicer Module
- b09: Mortgagor Module
- b10: Mortgage Vendor Module
- b11: Phone/Notes log Module
- b12: Tasks Tracking Module
- b13: Govt. Agency Module

OFFICE MANAGEMENT SOLUTION

CROSS-REFERENCE TO RELATED APPLICATION(S)

The present application derives priority from U.S. provisional application Ser. No. 61/197,496 filed 28 Oct. 2008.

BACKGROUND OF THE INVENTION

1. Field of the Invention

The present invention relates to business practice management systems and, more particularly, to a practice management software solution for increased efficiency.

2. Description of the Background

The challenge today for professional practices, including law offices, accounting firms and physician practices, is to maintain a high degree of client satisfaction while keeping finances healthy. Technology can help to meet this challenge, but only if the technology is managed efficiently. There are various existing software solutions for managing various aspects of various types of business practices, including inventory, employees, client accounts, and records. Unfortunately, most of these solutions are task-specific. Consequently, practice managers must compile a collection of different software packages, and a number of expensive, inadequate, mismatched tools that quickly become obsolete. Global practice management is a more difficult task.

Every practice has, at a foundation level, the need and participation of:

Vendors or suppliers who supply the resources essential to run the businesses

Clients, businesses or entities wanting to buy goods and services

Employees who make sure to run the business and who have up-to-date skills and knowledge related to the business.

Management of business daily functions: accounting, legal, insurances, Human Resources (HR), compliance, Record keeping, etc.

A need to do marketing and out reach programs

Social and networking needs

Recharging, leisure, entertainment needs.

As a specific example, the participants in a delinquent loan resolution (a "workout") include the borrower, loan servicer, lender/investor, guarantor/insurer, and various support-providing vendors, or third-party data providers. The lender may be a government institution such as Freddie Mac, Fannie Mae), or private investors, plus a loan guarantor or insurer including the Federal Housing Administration (FHA), US Department of Housing and Urban Development (HUD) and US Veteran's Administration (VA), and private mortgage insurer.

In standard practice, when a mortgage loan is defaulted, the loan servicer will send a default package to the borrower detailing their options. A loan servicer will follow up and attempt to resolve a delinquent loan by multiple telephone attempts. Borrower contact or the lack thereof gives rise to the need for information from other sources, such as support-providing vendors; like a borrower contact agent, property inspector, appraiser, credit history repository, escrow/settlement agent, real estate broker, attorney, title company, and so forth. Each attempt to contact a borrower, every borrower contact, and every supporting vendor order and corresponding product gives rise to a data entry documenting the contact, order, or product.

If the borrower is willing to discuss their situation, initial information relating to the delinquent loan is collected by the loan servicer, contact vendor or Counseling Agency. The information is assembled and then passed to a loan service counselor, whose responsibilities include a full borrower interview, credit counseling, financial evaluation; and pre-qualification of likely loan dispositions (unassisted reinstatement, assisted reinstatement, impossibility of reinstatement), and ultimate creation of an appropriate workout solution. All of this must be completed in compliance with lender/investor and guarantor/insurer's requirements; management consultation; dissemination of recommendations; workout-plan approval from interested parties; and implementing the workout plan.

From the Mortgage Insurer/Investor perspective, the most crucial element to all this is time. In order to establish an adequate coverage ratio for defaulted loans, Mortgage Insurers/Investor are required to maintain sizable loan loss funds. The size of these funds is derived from an estimate of loan delinquencies based on a rolling average of actual loan delinquencies. As soon as a loan is indicated as in default, it is added to the estimate and for as long as it is carried on the books as a default loan it increases the Mortgage Insurer's/Investor's reserve requirement. Every dollar of reserve carries an opportunity cost, and so it is in the Mortgage Insurer/Investor's best interest to resolve default loans as soon as possible. Moreover, statistically the odds of collecting on a defaulted loan decrease dramatically with time. With existing procedures, the Mortgage Insurer/Investor working with loan services and all other participants typically require 60-90 days to workout a loan, or an average of 8-10 months to navigate the foreclosure process. Moreover, of all the delinquent borrower contacts made by loan servicers, only ten to twenty percent (10-20%) are successful. The Mortgage Insurer/Investor can mitigate their loss funds and losses considerably by reducing this timeframe, closing default workouts, providing additional financial assistance where needed to consummate loss mitigation deals, and clearing the loans from their books more quickly, all of which is possible with an electronic workflow platform.

Similar dynamics exist in the heathcare arena where the participants include the hospital, attending physician, payor (insurer), patient, and various support-providing vendors, or third-party data providers. Healthcare costs can be substantially mitigated by reducing the time to diagnosis and treatment, and this too is possible with an electronic workflow platform.

As a consequence, there is presently a great need for a system that is easily accessible by the various parties that both facilitates information gathering, integration, and analysis, and leads to the culmination of a guideline-compliant loan workout that mitigates losses to all effected parties. Specifically in the loan processing context, there is a need for a system that facilitates the simultaneous endeavors of continuous workout efforts and expedient foreclosure processing by all participants, while providing unique, high-level and detailed loan-level views of the servicing activities so that all parties to various concurrent processes are apprised of the loan status in real-time. There is also a need for a solution that tracks the entire spectrum of defaulted-loan servicing activities, through the default-loan Case Management process stages of:

1. Collection
2. Loss Mitigation
3. Foreclosure
4. Eviction
5. Bankruptcy
6. Claims 7. REO (real estate owned) Acquisition and Maintenance (REO is a class of property owned by a lender, typically a bank, after an unsuccessful sale at a foreclosure auction)
8. REO Disposition all on the same processing platform using an open architecture for data exchange with the various participants and the various third party applications used by those participants at the various stages of Case Management.

What is needed is a business practice management system that manages the foregoing in an integrated fashion, has the flexibility to be implemented with a wide variety of other business practices such as default-loan servicing and healthcare, is easily adaptable to changes in needs of business practices, and can be delivered to the business practice without requiring investment in equipment or products. The present invention fulfills these needs by providing features, applications and services focused toward just these tasks. Simply, it is a software solution for maintaining a healthy business environment (healthy margins, happy clients and employees and willing suppliers with a established name and credibility to the business).

SUMMARY OF THE INVENTION

Accordingly, it is an object of the invention to provide a global business practice management system based on a prescribed workflow with defined interactions between the users of the system. The foregoing and other objects are herein disclosed in the context of a web based practice management system that brings together various participants involved in management of a business, facilitates communication and imposes a prescribed workflow with defined interactions between the participants. The practice management system according to the present invention can also manage assets and human resources, including employees, client accounts, inventory, and records. The practice management system comprises a hierarchy of particular software modules deployed on a distributed client server hardware platform via dedicated web portals for each of the particular participants. The modules are selectively made available to participants based on permissions, and the modules collectively provide each participant all the essential tools to manage their workflow. A specific example is disclosed in which the practice management system workflow in default mortgage cases, through day-to-day work scheduling, tracking, document generation, communication with office tools, smooth integration with the existing business software, emailing, scanning, faxing, and a single-sign on capability to access other third party software's, sites, and web applications. The web-based application allows for easy secure access and all the data sharing and connectivity abilities between all participants to the workout. The practice management system specifically provides the following capabilities:
Case Management
Phone Log & Diary (Notes)
Reports & Charts
Document Generation & Management
Referral Opening
Work Flow Management
Access Control System
Escrow
Secure Messaging, Email, Fax
Role based security
Data exchange using "open architecture" format and methods The business practice management system has the flexibility to be implemented with a wide variety of other business practices such as healthcare, is easily adaptable to changes in needs of business practices, and can be delivered to the business practice without requiring investment in equipment or products.

For a more complete understanding of the invention, its objects and advantages, refer to the remaining specification and to the accompanying drawings.

BRIEF DESCRIPTION OF THE DRAWINGS

Other objects, features, and advantages of the present invention will become more apparent from the following detailed description of the preferred embodiment and certain modifications thereof, in which:

FIG. 7 is an itemization of the different sub-modules of the Business Process Module required for the legal foreclosure-oriented practice.

DETAILED DESCRIPTION OF THE PREFERRED EMBODIMENTS

The present invention is a software solution for comprehensive workflow management in an office environment. The software may be deployed in a variety of office settings, including healthcare providers, law offices, accounting offices, etc. For purposes of illustration, the software is herein described in the context of a default loan workflow management solution, and may be readily adapted to a healthcare workflow management solution.

Figure 1:
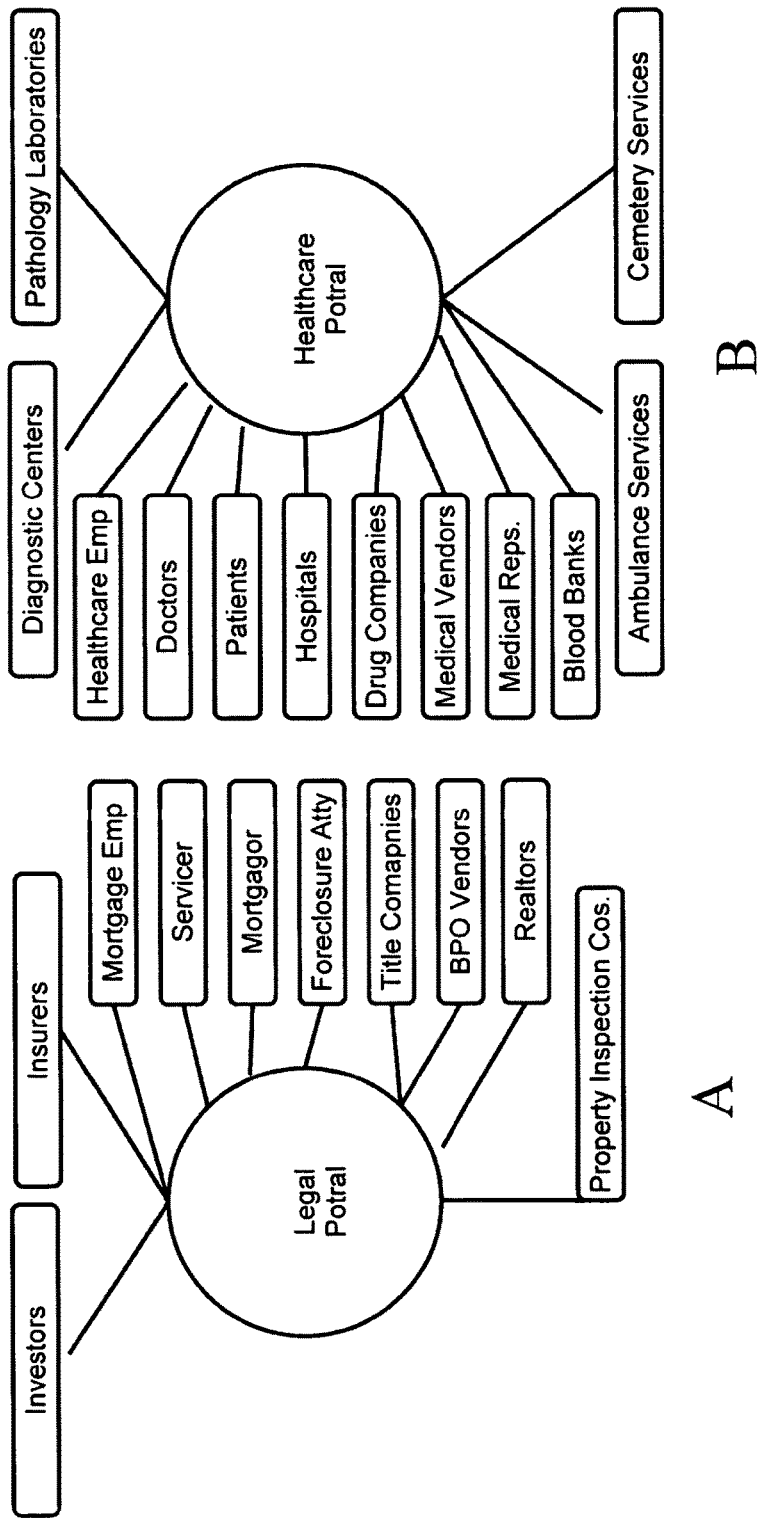
FIG. 1 illustrates illustrates the various participants involved in two exemplary forms of business practice management, default loan servicing at (A) and healthcare at (B).

FIG. 1 illustrates the various participants involved in these two exemplary forms of business practice management, default loan servicing at (A) and healthcare at (B). For default loan servicing at (A) the participants generally include the Investors, Loan Insurer, the Mortgage Company (Lender) and its Employees, a Mortgagor/Borrower, Foreclosure Attorney, a Title Company, business process outsourcing (BPO) Vendors, Realtors, Property Inspection Companies and Servicers such as neutral/oversight organizations such as HopeNow™ offering debt management, credit counseling and overall foreclosure counseling, and the US Treasury. In the healthcare environment (B) the participants generally may include Diagnostic Centers, Pathology Laboratories, Healthcare Employees, Doctors, Patients, Hospitals, Drug Companies, Medical Vendors, Medical Reps, Blood Banks, Ambulance Services, and Cemetery Services.

The present invention provides an ecosystem in the form of a software and hardware platform for simultaneous participation of all the foregoing principal parties. that facilitates dialogue, guides and educates the participants, tracks activity, and provides information necessary for a speedier resolution.

In the default loan context of FIG. 1(A), the software and hardware platform facilitates simultaneous participation, guidance and collaboration through the default-loan Case Management process stages of Collection, Loss Mitigation, Foreclosure, Eviction, Bankruptcy Claims, REO Acquisition and Maintenance, and REO Disposition. It does this between the Investors, Loan Insurer, the Mortgage Servicer (Lender) and its Employees, a Mortgagor/Borrower, Foreclosure Attorney, Title Company, business process outsourcing (BPO) Vendors, Realtors, Property Inspection Companies, and Government agencies, while tracking all loan servicer/lender default-servicing activities, including foreclosure bankruptcy and claims, through a multilevel global perspective designed to provide a faster resolution to problem loan management. The system relies on a hardware foundation comprising a hub-and-spoke web-based client/server architecture, and a software foundation comprising an open-architecture modular array of web-based software for data exchange with the various participants and the various third party applications used by those participants. A URL-based (uniform resource locator) web portal is established for each of the participants. In addition, a hierarchical permissions scheme is assigned including administrator and individual users permissions. The participants use one or more client side computer stations for accessing their assigned web portal. The web portal includes hyperlinks to a plurality of index-tabbed webpages each including content for guiding the respective participants through all of the default loan resolution steps of collection, loss mitigation, foreclosure, eviction, bankruptcy, claims, REO acquisition and maintenance, and REO disposition. In addition to this workflow guidance, the participants also have access (through their web portals and based on the permissions scheme) to the server-hosted software modules which facilitate data exchange amongst the various participants, as well as the various third party applications used by those participants. The software modules cooperate with each other to collectively provide each participant all essential communication, data analysis and workflow management and tracking tools needed to complete their normal project workflow in a more convenient, timely and error-free manner. A specific example is disclosed in which the practice management system is applied to default mortgage cases, and includes day-to-day work scheduling, tracking, document generation, communication with office tools, smooth integration with the existing business software, emailing, scanning, faxing, and a single-sign on capability to access other third party software's, sites, and web applications. The web-based application allows for easy secure access and all the data sharing and connectivity abilities between all participants to the workout.

Figure 2:
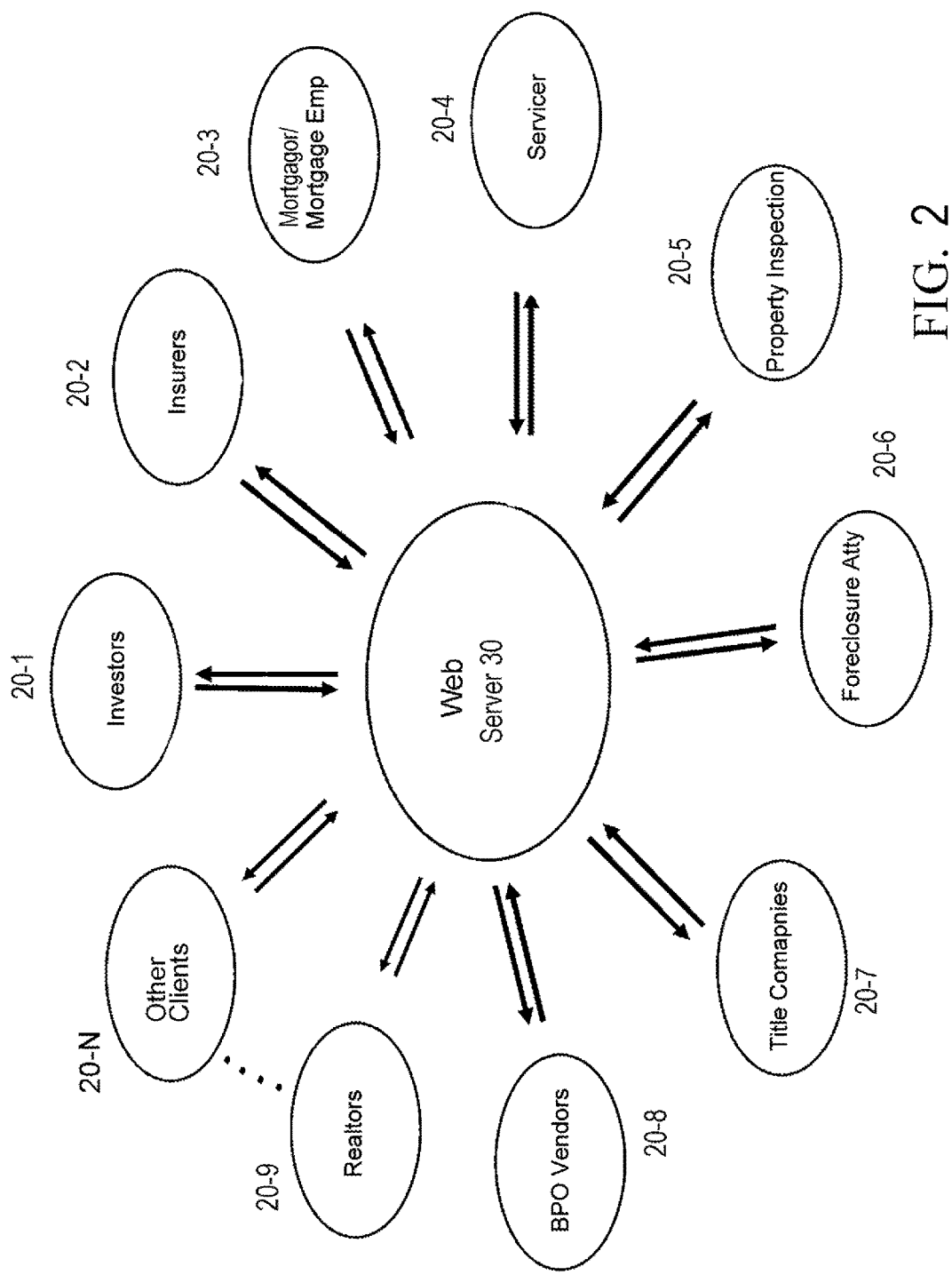
FIG. 2 is an illustration of the hardware architecture which is a distributed hub-and-spoke client server hardware architecture.

FIG. 2 is an illustration of the hardware architecture which is a distributed hub-and-spoke client server hardware architecture. At the participant level, the service is delivered through a plurality of Client Communications Terminals 20-1 (clients) through 20-N (here nine). Each Client Communications Terminal 20-1-9 is a conventional computer workstation with sufficient processing power to deliver a rich mix of audio, video, graphics, documents, and data. Groups of clients 20 are connected to a Network Server 30 via an internet backbone. The Server 30 is a web-enabled server hosting a resident routing database, which stores data authentication and verification information (usernames and passwords) correlating to registered participants.

Each client 20 is provided access to their own assigned web portal by which they access the present software resident on Server 30. The software comprises a modular array of open-architecture software configured specifically for each participant and user, that provides all the essential tools for that participant to communicate with other participants, manage each case for the day-to-day work scheduling, tracking, document generation, communication with office tools, smooth integration with the standard business software, emailing, scanning, faxing, etc. The particular modularity ensures open architecture and allows adding, upgrading and swapping of both hardware and software components. All of the client side computer stations 20-1 . . . N are in network connection to the central server 30, and all of the participant software modules are in communication with a central module that facilitates the overall workflow and data exchange. All Server 30 communication connections are made through an Internet backbone using a conventional router, using industry standard protocols such as the Transmission Control Protocol/Internet Protocol ("TCP/IP"), File Transfer Protocol (FTP), Hypertext Transfer Protocol Secure (HTTPS), Digital Imaging and Communications in Medicine standard (DICOM), etc.

Figure 3:
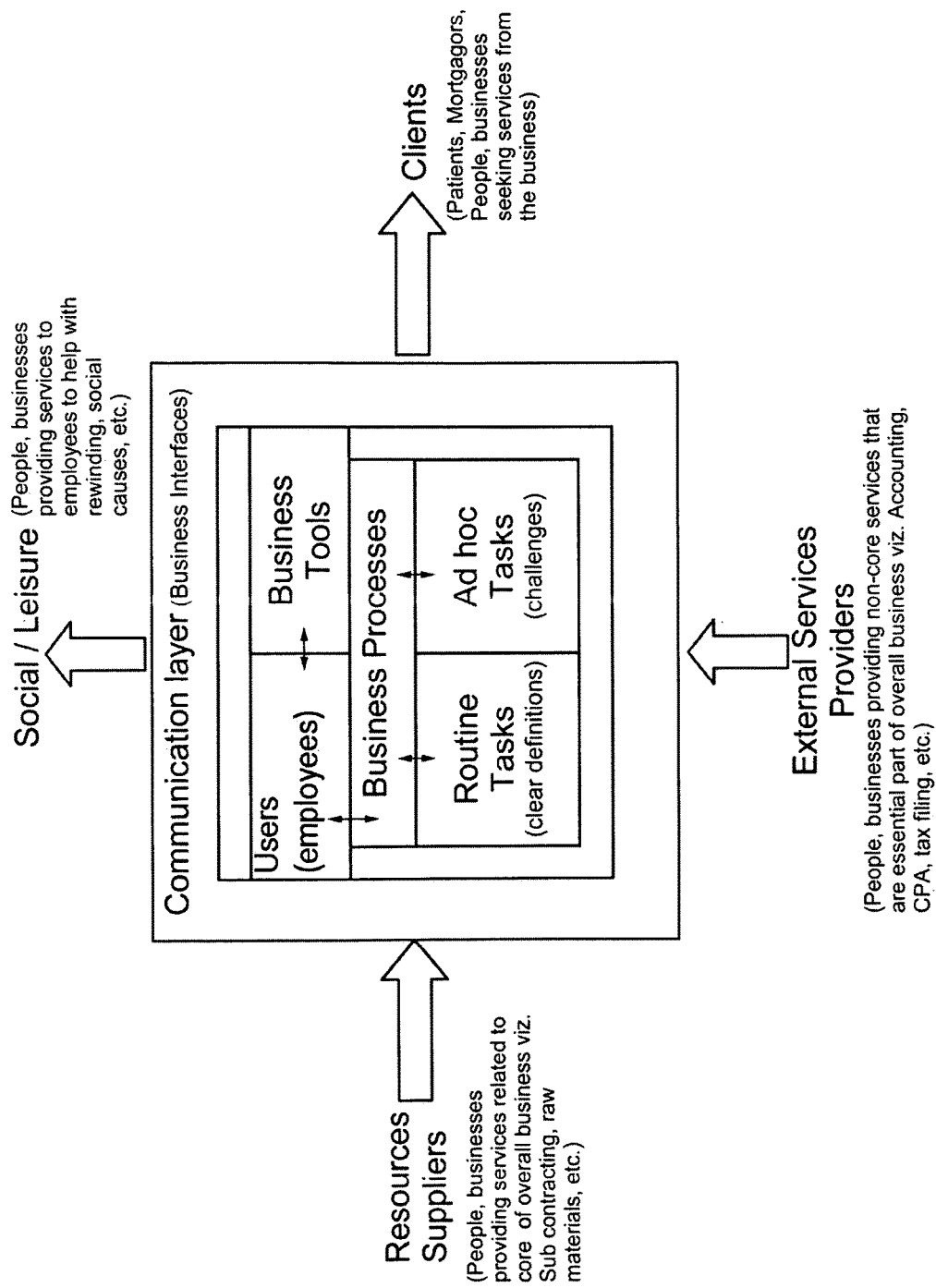
FIG. 3 is a conceptual illustration of the present software from the individual user's perspective.

FIG. 3 is a conceptual illustration of the present software from the individual user's perspective. Each user is confronted with Incoming External data inputs, including those from other participants such as Resource Suppliers (left) and External Service Providers (bottom). For example, if the software is deployed in a workout setting, and a Loan Servicer 20-4 is using the portal, Resources Suppliers may include product vendors, and External Service Providers may include $3^{rd}$ Party data analysis companies, or other service providers.

Each user provides certain data outputs including those to their Clients (right). In the workout setting the Clients are the Mortgage Lenders and their employees.

Each user may also provide Social/Leisure outputs not specific to a given workout case, such as internal human resource allocation, employee benefits, etc.

Within this context, the present software establishes a circumscribing communication platform or Communication Layer, and provides each user (employee) access to modular Business Tools (for emailing, faxing, etc.) and Business Processes that are specific to a given workout case (to be described). Those Business Processes may include routine clearly defined tasks, or ad hoc situation-specific tasks.

The software architecture is modular and relies on the Communication layer to facilitate the data inputs and outputs amongst the various participants. The software modules are shared by all participants via the surrounding Communications Layer, but are presented differently to each user depending on their participant affiliation and permissions level. The Communication Layer provides a circular interface surrounding all functions and applications inherent in the present software. The communication layer has the required (needed and appropriate) functionality to communicate with each side of the business square of FIG. 3. The Communication Layer incorporates various communication protocols such as TCP/IP, the known TCP/IP Suite defining a set of rules to enable computers to communicate over a network by governing how data should be formatted, addressed, shipped, routed and delivered to the right destination. It uses additional communication methods such as File Transfer Protocol (FTP), HTTPS, DiCOM, etc., as needed. The various protocols serve as means to take the information from one end to other end. The Communication Layer also provides a circular interface surrounding all Employees, who have access to incoming data and to a suite of Business Tools (to be described). The Employees can process and manage the data, and create data outputs to perform clearly defined Routine Tasks or less-well-defined Ad Hoc tasks. The data outputs resulting from the tasks performed by internal Employees may be outputted through the Communication layer to external Clients, or to other third parties dubbed "Social/Leisure." The present software modularizes the entire communication flow within the Communication layer, and all internal workflow management functions to be described, and each of the blocks shown in FIG. 3 represents one or more function-specific software modules.

Figure 4:
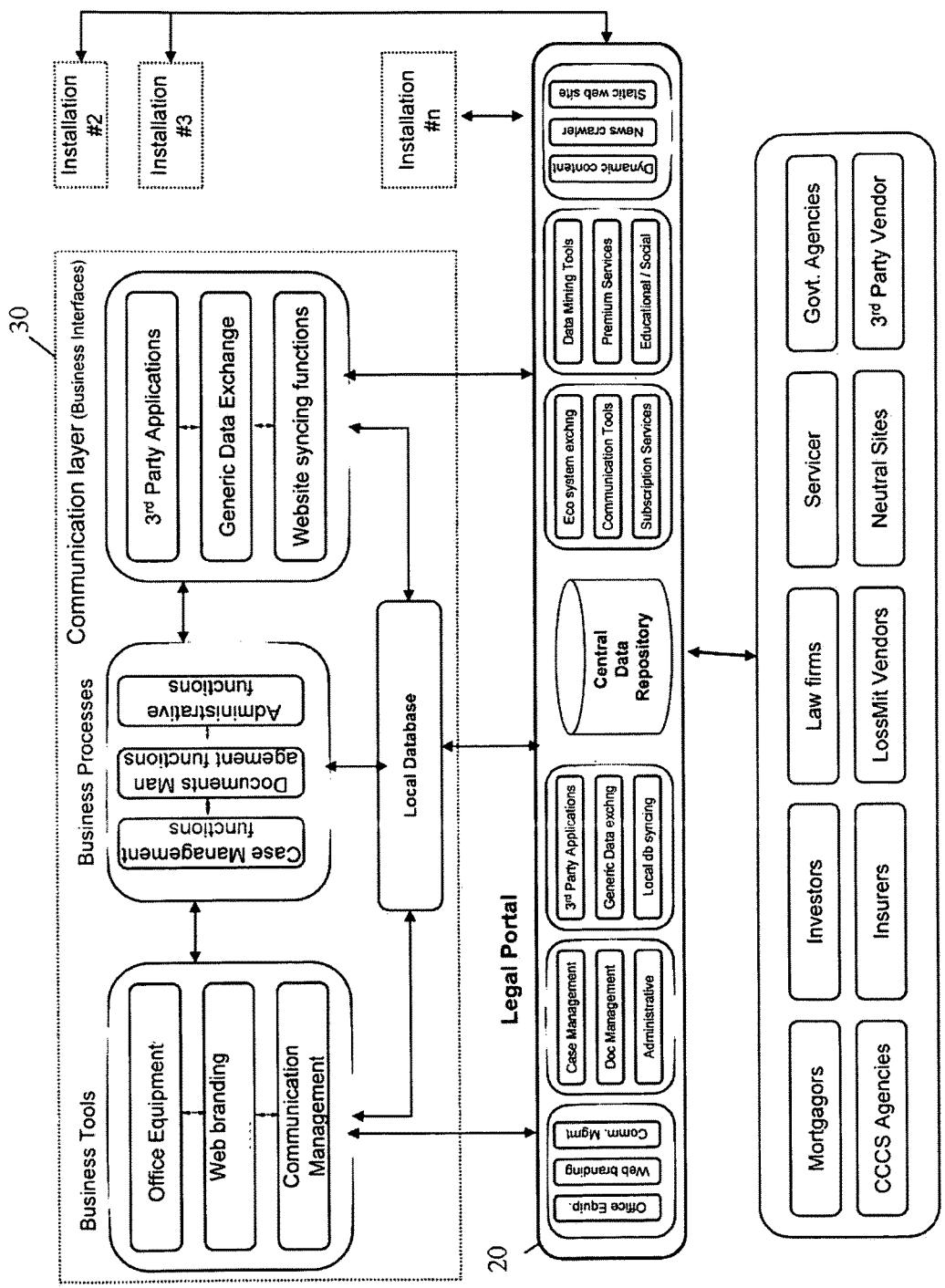
FIG. 4 is a more detailed schematic diagram of the software architecture of FIG. 3

FIG. 4 is a more detailed schematic diagram of the software architecture of FIG. 3, including architecture and communication flow implemented in the context of the workout (mortgage loss mitigation) software. The entire software architecture is modular and relies on the Communication layer to facilitate the data inputs and outputs amongst the various participants.

The Communication Layer, Business Tools, and Business Process Modules are all resident on the Server 30 of FIG. 2. In addition, the Server 30 maintains a local database of case-specific loan information including records of each Mortgagor's personal and financial information, and all three Communication Layer, Business Tools, and Business Processes Modules may access this database.

The Communication Layer mirrors all or part of the Server 30 database to a local database or Central Data Repository on each of the participant's stations 20-1 ... n, and each of the participant's stations 20 may access the Communication Layer, Business Tools, and Business Processes Modules as shown by arrows via their assigned web portal. The Communication Layer further comprises a plurality of communications interfaces, including interfaces to third party applications, a generic data exchange interface, and website syncing functions for accomplishing the above-described mirroring of the Server 30 database to a local database or Central Data Repository on each of the participant's stations 20-1 ... n. The website syncing functions also allow branding of each of the participants portals with their own trademarks and copyrighted content. The interfaces to third party applications comprise standard Electronic Data Interchange (EDI) functions for porting data in a user-controlled manner from third party software to the Server 30 database, e.g., a data-import translation map. The generic data exchange accomplishes data exchange amongst the various participant clients 20-1 ... n based on the participant identity and permissions granted. For example, the Property Inspection company 20-5 of FIG. 2 does not need to have access to the entire contents of the Server 30 local database, and so the generic data exchange controls the data that can be exchanged to each of the participants based on their permissions.

The Business Tools Module on Server 30 further comprises a networked array of office equipment including at least a network copier, scanner and fax machine. The Business Tools Module further comprises a Communications Management module (to be described) which essentially includes the original equipment drivers supplied by the office equipment manufacturers and management software for implementing those drivers on demand. In addition, the Business Tools Module includes a web branding module which is essentially a website content manager by which the various participant modules can be branded with the logos, trademarks, copyrighted content, etc. of each respective participant.

The Business Processes Module on Server 30 further comprises an array of case-specific Case Management Functions, an array of Document Management Functions, and an array of Administrative Functions as will be described.

All of the Communication Layer, Business Tools, and Business Process Modules and all of their sub-modules resident on the Server 30 are accessible by each of the participant clients 20-1 ... n (as seen mirrored therein) subject to that user's permissions.

Figure 5:
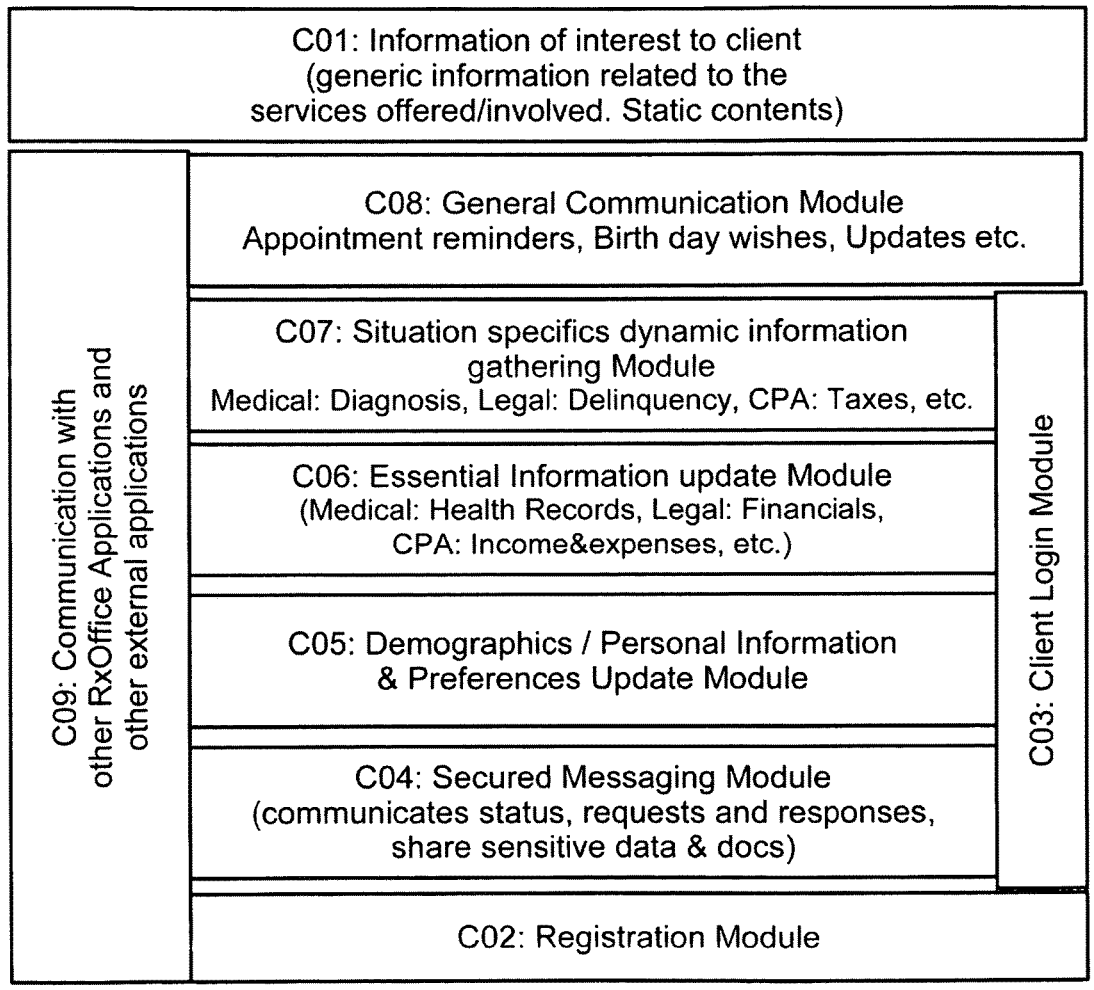
FIG. 5 is a more detailed block diagram of the Communication layer of FIGS. 3-4

FIG. 5 is a more detailed block diagram of the Communication layer of FIGS. 3-4, including the communications interfaces, interfaces to third party applications, generic data exchange interface, and website syncing functions. The Communication layer comprises a hierarchical collection of separate but inter-communicating software sub-modules each dedicated to performing one or more discrete communication tasks. The communication modules include the following:

C02: Registration Module
C09: Application Communication Module
C03: Client Login Module
C04: Secured Messaging Module
C05: Demographics/Personal Information & Preferences Update Module
C06: Essential Information update Module
C07: Situation specific dynamic information gathering Module
C08: General Communication Module
C01: Information of interest Module The Registration Module (C02) provides the ability for new participants to register to use the present system.

The Application Communication Module (C09) facilitates intercommunication between the various Business Tool applications and external applications used by users.

The Client Login Module (C03) provides a login facility by which registered users sign-on with username and password.

The Secured Messaging Module (C04) is an encryption module that can be called upon when necessary for secure communication of status, requests and responses, and sensitive data or information. This encrypts electronic communications pursuant to a standard Public Key Infrastructure (PKI) encryption scheme or other known scheme.

The Demographics/Personal Information Module (C05) is a database of User demographics, personal information and personal preferences with a graphical user interface to allow individual users to update this information.

The Financial Information update Module (C06) provides a user interface for allowing authorized users to modify project data stored in a central data repository. In the workout setting this is a database on Server 30 comprising mortgage (borrower) information and financials including income, expense, assets, and liabilities.

The Situation specific dynamic information gathering Module (C07) is a data mining module for gathering context-specific data.

The General Communication Module (C08) facilitates the communication of non-case specific general appointments, such as staff meeting and other appointment reminders, birthday reminders, etc.

Finally, the Information of interest Module (C01) facilitates communication of all static information of interest to another participant or Client. For example, when deployed in a legal setting for workout cases, the Information of interest Model (C01) module would include generalized borrower education information such as how to avoid foreclosure, various loss mitigation alternatives, loan refinancing, various loan and closing related calculators (to play "what-if" scenario). In a healthcare context, the Information of interest Module (C01) would include information related to health, such as informative articles about maintaining good health, treatment available, etc. The Information of interest Module (C01) generally comprises a static array of web pages presenting the content.

All data communication including external communication flow and the internal workflow management functions of each of the blocks shown in FIG. 1, are managed by the foregoing Communications modules of FIG. 5. Thus, for example, referring back to FIG. 3, all clearly defined Routine Tasks and Ad Hoc Tasks on data inputs/outputs are performed by Employees using the Business Tools, and the results may be outputted through the Communication layer to external participants such as clients.

Figure 6:
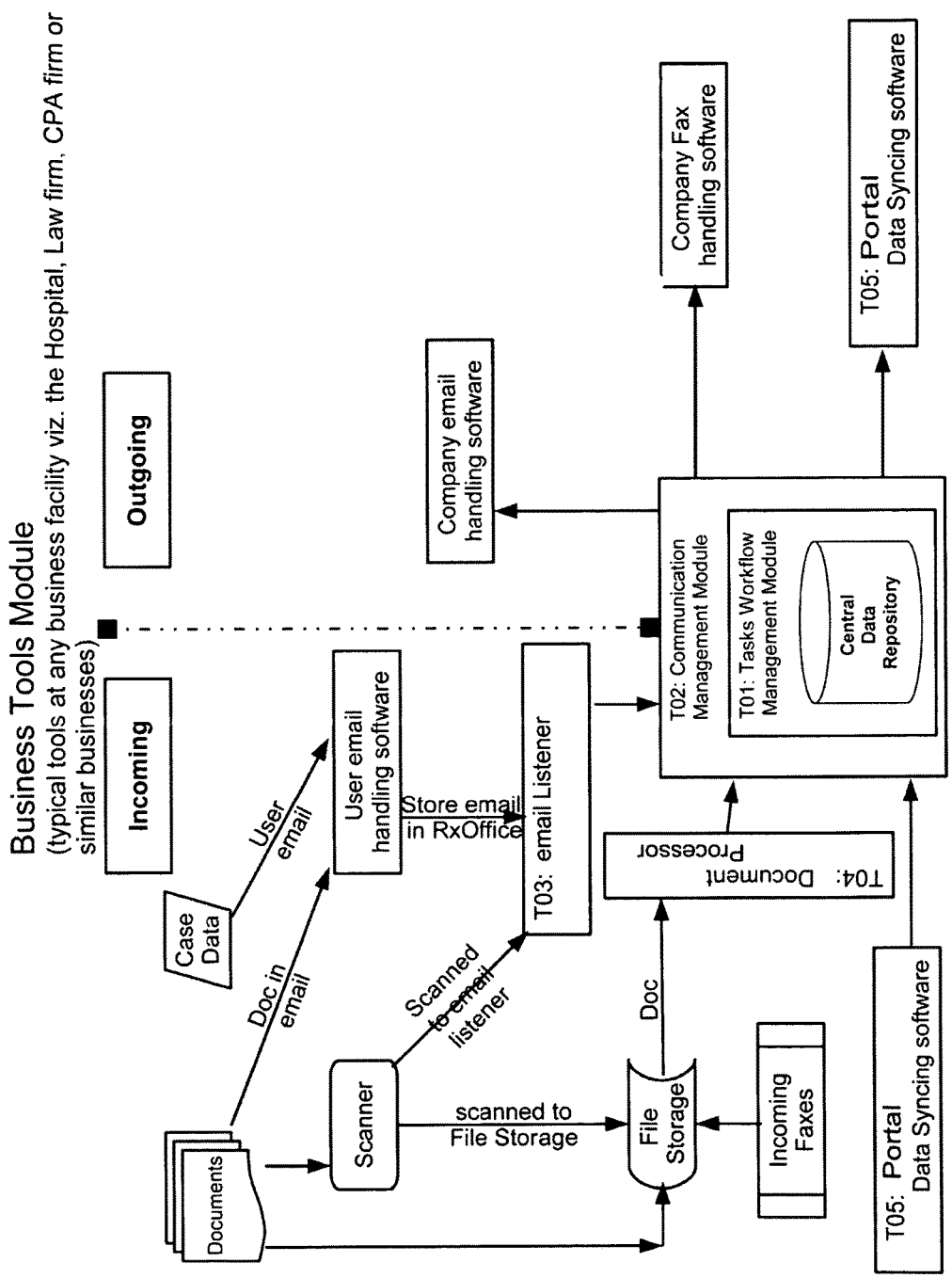
FIG. 6 is a more detailed block diagram of the Business Tools Module seen in FIGS. 3-4.

FIG. 6 is a more detailed block diagram of the Business Tools Module seen in FIGS. 3-4. The Business Tools Module software is in communication with the Central Data Repository mirrored onto each of the Client stations 20-1 . . . n, and is managed by a Tasks Workflow Management Module (T01) and Communication Management Module (T02).

Incoming Documents as seen at top left may come in hard copy, pre-scanned or text formats, or may be faxed in as shown at bottom left. Thus, incoming paper documents (top left) are scanned and, along with incoming faxes, are electronically stored in File Storage. The Business Tools Module routes these documents as appropriate either directly to file storage, to a scanning center (including a conventional document scanner), or to email handling software. The email handling software communicates with an email Listener module that interprets the subject line of emails for indexing and abstracting the attached documents. A variety of commercially-available email listening apps are available for this purpose. Faxed or pre-scanned documents are first stored locally in Local File Storage. The contents of the Local File Storage are processed by a Document Processor Module (T04).

Toward the top center there is a Data Mapping Translator Module (b54) that allows definition of data. The definition system lets data entities be related to each other, and it includes a user-selectable number of field types. This provides a user-customizable import/export template for data mapping to/from most any third party application.

The Data Mapping Translator Module (b54) is used by a Data Import/Export Module (b59) which is an Application Programming Interface (API) for import (parsing) and export (rendering) to/from formats such as Extensible Markup Language (XML) and Comma Separated Values (CSV). All defined data entities can be exported from, and imported into, the Central Data Repository.

A Status Update indicator (shown at top) monitors and displays the status of any import/export operation to the participant.

The task workflow module (T01) relies on a task scheduling knowledgebase (to perform tasks and resource allocation, completion, process tracking, trigger additional dependent tasks, cancels irrelevant tasks, and the like.

The Communication Management Module (T02) carries actual communications between various communications resources. For example, sending/receiving information, sending/receiving documents to/from email, sending/receiving information, and documents to/from the fax machine, sending/receiving information, document to/from various external applications, and sending/receiving information or documents to/from other document handling devices.

The Document Processor Module (T04) handles incoming electronic documents and data. With the assistance of an embedded knowledgebase, this Document Processor Module T04 triggers appropriate tasks when certain documents/data arrive. It also notifies the stakeholder participant, will eFile the document/data to the proper case folder, and may perform other tasks relevant to receiving of the document/data. The Local File Storage is integrated (mirrored) to the Central Data Respository (see also FIG. 3). Currently, Local File Storage is periodically synched with the Central Data Respository to mirror the contents. It is envisioned that the need for Local File Storage will diminish as communication protocols improve, in which case immediate storage in the Central Data Respository will be possible and the Local Storage will be unnecessary. The net result of the foregoing is that all incoming documents are uniformaly stored in the Central Data Repository in a singular format with appended indices and abstract for easy boolean searching.

Again referring back to FIG. 3, the Business Processes Module illustrated at center includes all Diagnostic Functions, Accounting Functions and Administrative Functions made available to employees of participants by the present software.

FIG. 7 is an itemization of the different sub-modules of the Business Process Module required for the legal foreclosure-oriented practice. In the exemplary legal context, the Business Processes illustrated at center includes all Management Functions, Accounting Functions and Administrative Functions made available to employees or the Participants by the present software. These Business Processes include at least the following software sub-modules:

Case Management Functions
b1: Foreclosure Module
b2: Bankruptcy Module
b3: Eviction Module
b4: Litigation Module
b5: Loss Mitigation Module
b6: Consumer Credit Counseling Service (CCCS) Module Documents
b7: Mortgage Insurer Module
b8: Servicer Module
b9: Mortgagor Module
b10: Mortgage Vendor Module
b11: Phone/Notes log Module
b12: Task Tracking Module
b13: Govt. Agency Module (Audit/Oversight Module)
Document Management Functions
b31: Dynamic Doc Generation Module
b32: Faxing Management Module
b33: email Management Module
b34: Doc workflow Management Module
b35: Document Archival Module
b36: Document Processor
Administrative Functions
b51: My Preferences Module
b52: Work flow Management Module
b53: Secured Messaging Module
b54: Manual Diary Module
b55: Contacts Rolodesk Module
b56: Userlog Auditing Module
b57: Reporting Module
b58: Communication Management Module
b59: Data Import/Export Module
b60: Backup/Restore Module
b61: Masters Maintenance Module
b62: System Administration Module
b63: Utilities/Tools Module The Foreclosure Module (b1) guides the user through administration of a foreclosure action, including data entry of salient data gained through the process.

The Bankruptcy Module (b2) guides the user through administering a bankruptcy action, including data entry.

The Eviction Module (b3) guides the user through administering an eviction proceeding, including data entry.

The Litigation Module (b4) guides the user through a civil court action against the mortgagor, including data entry.

The Loss Mitigation Module (b5) guides the user through a loss mitigation settlement. For example, Loss Mitigation Module (b5) will by a series of displayed forms guide a loan counselor through a series of questions to be asked of a borrower all relating to various loss mitigation solutions, various borrower reasons for not repaying a loan, and provides a data entry capability for recording answers.

The CCCS Module (b6) guides a consumer credit counseling service user through the work flow of providing consumer credit counseling to a defaulted mortgagor, likewise with data entry.

All of the data entry results from above are filtered and communicated back the Central Data Repository as described above, and all major reminders, deadlines and other events (past and future) for the loan in default are compiled and passed back to the above-described modules to populate the screens displayed to the participants.

The different sub-modules of the Business Process Module also include administrative functions for allowing administrators to control document processing and workflow. These include the Dynamic Document Generation Module (b31), a Faxing Management Module (b32), an email Management Module (b33), a Document workflow Management Module (b34), a Document Archival Module (b35).

In addition, the different sub-modules of the Business Process Module also include administrative functions for allowing users and administrators to set preferences, view reports, and access administrative tools such as contact manager (eRolodex) and calendar. These include the My Preferences Module (b51), the Work flow Management Module (b52), the Phone/Notes log Module (b53), the Manual Diary Module (b54), the Contacts Rolodesk Module (b55), the Userlog Auditing Module (b56), the Mortgage Insurer Module (b07), the Reporting Module (b57), the Servicer Module (b08), the Human Resources Module (b58), the Debtor/Mortgagor Module (b09), the Data Import/Export Module (b59), Mortgage Vendor Module (b10), Backup/Restore Module (b60), Reporting Module (b11), Masters Maintenance Module (b61), Tasks Tracking Module (b12), System Administration Module (b62), Case Billing Module (b13), and a Utilities/Tools Module (b63).

The My Preferences Module (b51) allows individual users to set individual display preferences similar to a Microsoft™ Windows environment.

The Work flow Management Module (b52) allows customization of the workflow implemented by any of the above-described modules b1-b6.

The Phone/Notes log Module (b53) provides a simple on-screen call log with notes function.

The Manual Diary Module (b54) allows a user to record their efforts working on a given case.

The Contacts Rolodesk Module (b55) provides a contact manager.

The Userlog Auditing Module (b56) allows an administrator to inspect a log of users for auditing purposes.

The Mortgage Insurer Module (b07) provides a portal to private mortgage insurers such as Freddie Mac, Fannie Mae, FHA/HUD, VA, and private mortgage insurers.

The Reporting Module (b58) provides pre-defined as well as fully customizable reports displaying relevant information by loan number, date, etc. These reports may be printed to hard copy.

The Servicer Module (b08) provides a portal to third party loan servicers.

The Human Resources Module (b58) provides a portal for participant human resource managers.

The Debtor/Mortgagor Module (b09) provides a web portal for the mortgagees (borrowers) by which they can view their own case financials and communicate.

The Data Import/Export Module (b59) provides a data import/export capability on demand for importing data, for example, to/from spreadsheets, etc.

The Mortgage Vendor Module (b10) provides a portal for the mortgagor (lender).

The Backup/Restore Module (b60) provides a control function for backing up and/or restoring database data.

The Masters Maintenance Module (b61) provides a portal for court-appointed special masters.

The Tasks Tracking Module (b12) tracks the entire spectrum of defaulted-loan servicing activities, from collections through foreclosure on the same processing platform, as that on which resides the applications to perform these activities, is not known to exist.

The System Administration Module (b62) provides global administrator settings, including user permissions.

The Case Billing Module (b13) provides a recording tool for inputting case billing information.

The Utilities/Tools Module (b63) provides a variety of data utilities as a matter of design choice.

The above-described modules and sub-modules are selectively made available to all the participants based on administrator-defined permissions, and the modules collectively provide each participant all the essential tools to manage their workflow. In default mortgage cases, the system facilitates all communication, guides and tracks the participants through day-to-day work scheduling, tracking, document generation, communication with office tools, smooth integration with the existing business software, emailing, scanning, faxing, and a single-sign on capability to access other third party software's, sites, and web applications. The web-based application allows for easy secure access and all the data sharing and connectivity abilities between all participants to the workout.

Figure 8:
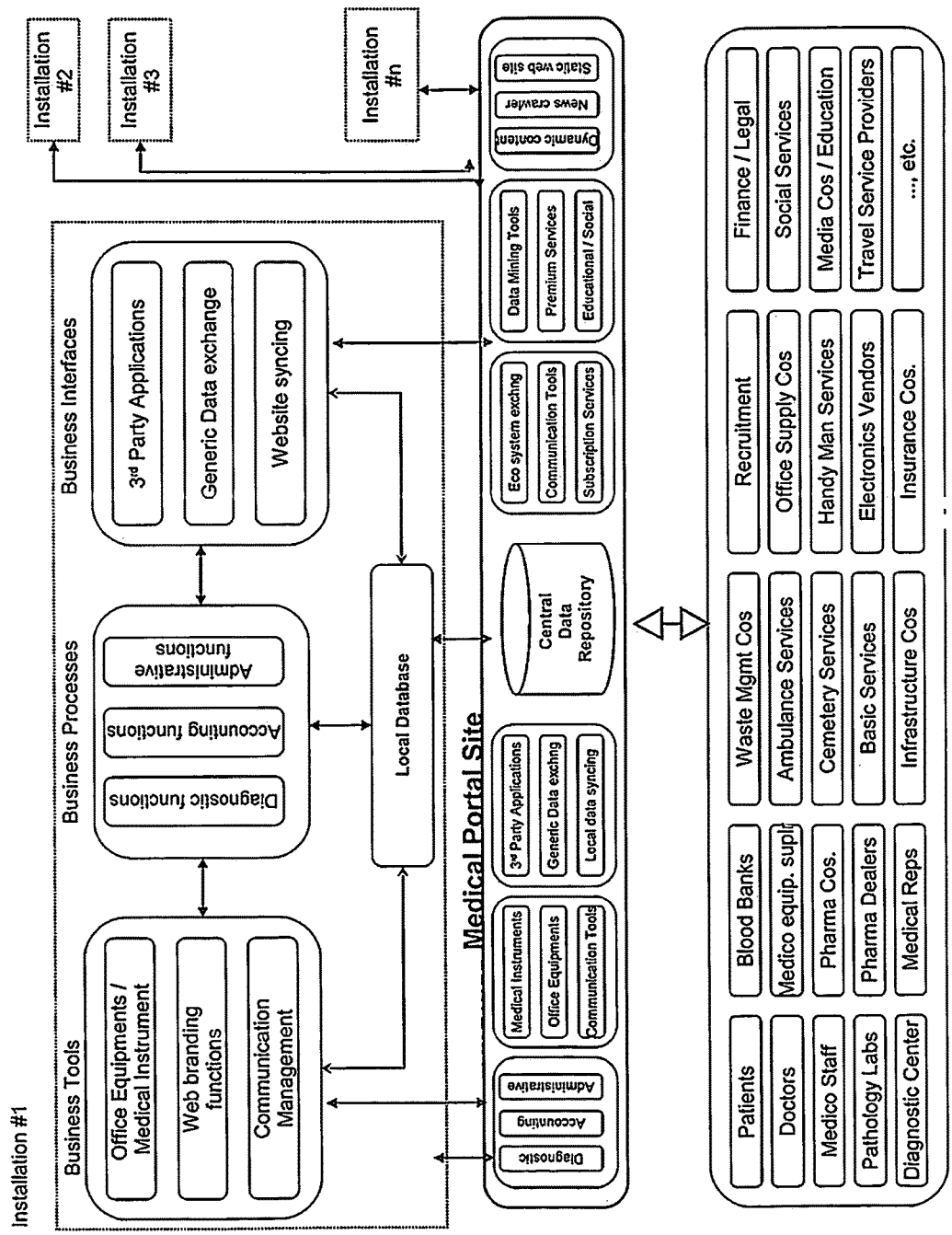
FIG. 8 illustrates the architecture adapted for a healthcare-oriented practice.

The same above-described architecture can easily be adapted to a medical practice by altering the different sub-modules of the Business Process Module shown in FIG. 7 to a healthcare provider practice, as seen in FIG. 8. The problems inherent in dealing with a sick patient are similar to those found dealing with a sick loan (delinquent loan) industry. Both situations have a sensitivity involved, timely help plays a critical role and privacy is of prime concern. Both industry have oversights and regulations to keep compliance eye on. Both industry operations at technology level are very similar and even at human level they match more than 95% as far as the Business Processes are concerned.

FIG. 8 illustrates the architecture adapted for a healthcare-oriented practice, and the similarities are apparent. The processes and functionality remain the same, and only the participants change.

In the medical context, these Business Processes would include at least the following software modules:
Diagnostic Functions
B1: Clinical Module
B2: Out Patients Dept. Module
B3: In Patients Dept. Module
B4: Pathology Module
B5: Gynecology Module
B6: Radiology Module
B7: Urology Module
B8: Operation Theater Module
B9: Pediatric Module
B10: Eye Checkup Module
B11: Pharmacy Module
B12: Examination Module
B13: Ortho Module
Accounting Functions
B31: Billing Module
B32: Acct Reports Module
B33: Acct Payables Module
B34: Acct Receivables Module
B35: Inventory Module
B36: Financials Module
B37: Year End Closing Module
Administrative Functions
B51: My Assistant Module
B52: Patient Registration Module
B53: Doctor Scheduling Module
B54: Reminder Module
B55: Letters/Certificates Module
B56: Contacts Rolodesk Module
B57: Time Keeping Module
B58: Reporting Module
B59: Human Resources Module
B60: Data Import/Export Module
B61: Backup/Restore Module
B62: Masters Maintenance Module
B63: System Administration Module
B64: Utilities Module In the medical context, the pharmacy module directly interfaces with $3^{rd}$ party pharmacies to track and execute prescription orders. This module is constructed atop a foundation comprising a specific relational database design coupled with a simple user interface that allows direct data entry and forms generation by attending physicians and nurses. Prescriptions are automatically translated into the patient's language (Doctor prescribes in English language; software translates the prescription in the Patients' language, say Hindi, Marathi, Tamil, Punjabi, Gujarati, etc.—All major official language translations are supported. Easy addition for other language supports. For example: Adding support to French language or Spanish language requires just a simple addition into application repository.)

The My Assistant module includes features that are useful to users in day-to-day; for which Doctors interface with fellow employee Assistants. These include an address book, emails, reminders, etc. Facilities such as editing, canceling, dismissing reminders are part of the module. Users can also maintain their own personal contact book, or share the Hospital contact book. For each contact, user can capture extensive information: Birth date, anniversary date, marital status, name of spouse & children, work address, home address, all contact numbers, emails, etc. Additionally, user can enter free form notes. These notes may help user to note down the talking points during last conversation or any particular follow-ups as they pop-up in users mind. Users can also store the photo of the contact person along with other contact information. Users can dynamically add new categories or address type—making it a full contact information without any compromise. Users have choice to import/export data into/from contacts. Users can set reminders for themselves or for other users of the system. Additionally, user have a choice of setting the priority for the reminders. This way, low priority tasks will not get ahead of more important tasks. Users can send emails to the contacts that are in users contact book (personal or corporate). The email composing is done in the software. Software relies on the email client that user has established on the computer/laptop for sending the actual email.

The SysAdmin Module allows administrators to set privileges and complete overall system administration.

The Examination Module is a physician encounter tracker that tracks all provider encounters from physicians and therapists.

It should now be apparent that the above-described business practice management system manages communications and workflow in an integrated fashion, has the flexibility to be implemented with a wide variety of other business practices, is easily adaptable to changes in needs of business practices, and can be delivered to the business practice without requiring investment in equipment or products. In the default loan context, the system facilitates information gathering, integration, and analysis, and leads to the culmination of a guideline-compliant loan workout that mitigates losses to all effected parties. Specifically the system facilitates the simultaneous endeavors of continuous workout efforts and expedient foreclosure processing by all participants, while providing unique, high-level and detailed loan-level views of the servicing activities so that all parties to various concurrent processes are apprised of the loan status in real-time. While doing this the system tracks the entire spectrum of defaulted-loan servicing activities, from collections through foreclosure on the same processing platform, as that on which resides the applications to perform these activities. The system essentially provides a computer ecosystem for maintaining a healthy business environment (healthy margins, happy clients and employees and willing suppliers with a established name and credibility to the business).

Having now fully set forth the preferred embodiments and certain modifications of the concept underlying the present invention, various other embodiments as well as certain variations and modifications of the embodiments herein shown and described will obviously occur to those skilled in the art upon becoming familiar with said underlying concept. It is to be understood, therefore, that the invention may be practiced otherwise than as specifically set forth in the appended claims.

I claim:
1. A business practice management system, comprising:
a hub-and-spoke web-based client/server architecture including a plurality of remote client terminals each including a resident non-transitory computer-readable storage medium, one client terminal for each primary participant in a default mortgage case including at least an Investor, Loan Insurer, Mortgage Lender, Loan Servicer, Loan Service Counselor, Vendor, Foreclosure Attorney, Title Company, and Business Process Outsourcing (BPO) Vendor, Realtor, and Property Inspection Company, and a web server in direct communication with all of said client terminals through an Internet backbone;
a Uniform Resource Locator (URL) web portal assigned to each of said participants, said web portal including links to a plurality of index-tabbed webpages each including content for guiding the respective participants through all of the default loan resolution steps of collection, loss mitigation, foreclosure, eviction, bankruptcy, claims, Real Estate Owned (REO) acquisition and maintenance, and REO disposition;

a central database of information stored on a non-transitory computer-readable storage medium resident on said web server and storing case-specific loan records including personal and financial information or mortgagors;

a local database stored on said non-transitory computer-readable storage medium resident on each of said remote client terminals and containing a mirrored subset of said central database of information resident on said web server; and a modular array of web-based software stored on non-transitory computer-readable storage medium resident on said web server for data exchange with the various participants and the various third party applications used by those participants that facilitates dialogue, guides and educates the participants, tracks activity, and provides information necessary for a speedier resolution, said modular array of software further comprising at least the following software modules, a communication software module comprising computer instructions for controlling data communication between said web server and any one of said remote client terminals and directly between any plurality of said remote client terminals, and for storing and synchronizing said mirrored local copy of said central database of information on each of said remote client terminals, and, a system administration software module in communication with said communication software module comprising computer instructions for maintaining a record of user permissions, and for selectively enabling said communication software module to communicate data along said hub-and-spoke web-based client/server architecture such that data communication may selectively occur in accordance with said record of user permissions directly between two of said remote client terminals, but synchronization of said mirrored local copy of said central database of information to each of said remote client terminals is through said web server as follows, write mirrored data from a local database on a remote client terminal to the central database resident on said web server in accordance with said record of user permissions, and read mirrored data from the central database resident on said web server to a local database on a remote client terminal in accordance with said record of user permission and a Task Tracking Module comprising computer instructions for tracking each said data communication between said remote client terminals, and for tracking each said synchronization of said mirrored local copy of said central database of information to each of said remote client terminals through said web server, said Task Tracking Module also tracking activity by the respective participants through all of the default loan resolution steps of collection, loss mitigation, foreclosure, eviction, bankruptcy, claims, Real Estate Owned (REO) acquisition and maintenance, and REO disposition.

2. The business practice management system according to claim 1, wherein said modular array of web-based software further comprises a Business Tools module for emailing, faxing, and document processing, and a Business Processes module for collaborative work on a specific default loan workout case.

3. The business practice management system according to claim 2, wherein said Business Processes module further includes a plurality of business case management applications, document management applications, and administrative applications for processing said incoming data to produce said data outputs.

4. The business practice management system according to claim 3, wherein said software modules are open architecture to allow adding, upgrading and swapping of software modules.

5. The business practice management system according to claim 3, wherein said Business Processes module further includes Foreclosure Module for guiding a user through administration of a foreclosure action, a Bankruptcy Module for guiding the user through administering a bankruptcy action, an eviction Module for guiding a user through administering an eviction proceeding, a Litigation Module for guiding a user through a civil court action, a Loss Mitigation Module for guiding a user through a loss mitigation settlement, and a Consumer Credit Counseling Service (CCCS) Module for guiding a user through provision of consumer credit counseling to a defaulted mortgagor.

6. A computer-implemented business practice management method for managing workflow and communications for participants in a default mortgage case, the method comprising the steps of:

providing a hub-and-spoke web-based client/server architecture including a plurality of remote client terminals each including resident non-transitory computer-readable storage medium, one client terminal for each primary participant in a default mortgage case including at least an Investor, Loan Insurer, Mortgage Lender, Loan Servicer, Loan Service Counselor, Vendor, Foreclosure Attorney, Title Company, and Business Process Outsourcing (BPO) Vendor, Realtor, and Property Inspection Company, a web server in direct communication with all of said client terminals through an Internet backbone;

providing a central database of information stored on non-transitory computer-readable storage medium resident on said web server and storing case-specific loan records including personal and financial information on mortgagors, and a local database stored on said non-transitory computer-readable storage medium resident on each of said remote client terminals and containing a mirrored subset of said central database of information resident on said web server;

assigning a Uniform Resource Locator (URL) web portal to each of said participants, said web portal including links to a plurality of webpages each including content for guiding the respective participants through all of said default loan resolution steps of collection, loss mitigation, foreclosure, eviction, bankruptcy, claims, Real Estate Owned (REO) acquisition and maintenance, and REO disposition, and for displaying and updating said default mortgage case history and borrower information during each of said default loan resolution steps; and providing a modular array of web-based software stored on non-transitory computer-readable storage medium resident on said web server for data exchange with the various participants and the various third party applications used by those participants, said modular array of software further comprising at least a case management software module, a communication software module comprising computer instructions for controlling data communication between said web server and any one of said remote client terminals and directly between any plurality of said remote client terminals, a Task Tracking Module, and a system administration software module in communication with said communication software module and comprising computer instructions for maintaining a record of user permissions, and for selectively enabling said communication software module to communicate data along said hub-and-spoke web-based client/server architecture, and for storing and synchronizing said mirrored local copy of said central database of information on each of said remote client terminals such that data communication may selectively occur in accordance with said record of user permissions directly between two of said remote client terminals, but synchronization of said mirrored local copy of said central database of information to each of said remote client terminals is through said web server;

one of said participants accessing case management software module in accordance with pre-assigned permissions, said case management software module guiding said participant through all of all of said default loan resolution steps to facilitate data entry of information necessary for a speedier resolution;

communicating said data directly between remote client terminals by said communication software module selectively allowing said data communication in accordance with said record of user permissions;

writing mirrored data from a local database on a remote client terminal to the central database resident on said web server by said communication software module selectively allowing said writing in accordance with said record of user permissions, and reading mirrored data from the central database resident on said web server to a local database on a remote client terminal by said communication software module and selectively allowing said reading of mirrored data in accordance with said record of user permissions;

tracking each said data communication between said remote client terminals, and tracking each said synchronization of said mirrored local copy of said central database of information to each of said remote client terminals through said web server, using said software Task Tracking Module.

7. The computer-implemented business practice management method according to claim 6, wherein said modular array of web-based software further comprises a Business Tools module for emailing, faxing, and document processing by said participants, and said steps further comprise one of said participants accessing said Business Tools module for faxing a document.

8. The computer-implemented business practice management method according to claim 7, wherein said modular array of web-based software further comprises a Business Process module for collaborative work on a specific default loan workout case, and said steps further comprise at least two of said participants accessing said Business Processes module for collaborating work on a specific default loan workout case.

9. The computer-implemented business practice management method according to claim 8, wherein said Business Process module further includes a plurality of business case management applications, document management applications, and administrative applications for processing incoming data during all of said default loan resolution steps to produce said data outputs, and said step of at least two of said participants accessing said Business Processes module for collaborating work on a specific default loan workout case comprises importing data in XML/XLS/CSV/Flatfile format into said central database.

10. The computer-implemented business practice management method according to claim 7, further comprising a step of said communication software module controlling all of said software modules and participants in accordance with the administration software module record of permissions.

11. The computer-implemented business practice management method according to claim 6, wherein said software modules are open architecture to allow adding, upgrading and swapping of software modules.

12. The computer-implemented business practice management method according to claim 8, wherein said step of at least two of said participants accessing said Business Processes module for collaborating work on a specific default loan workout case further comprises providing said users a selection of a Foreclosure Module for guiding a user through administration of a foreclosure action, a Bankruptcy Module for guiding the user through administering a bankruptcy action, an eviction Module for guiding a user through administering an eviction proceeding, a Litigation Module for guiding a user through a civil court action, a Loss Mitigation Module for guiding a user through a loss mitigation settlement, and a CCCS Module for guiding a user through provision of consumer credit counseling to a defaulted mortgagor.

13. The computer-implemented business practice management method according to claim 6, further comprising a step of mirroring said local databases to said central data repository for access by said participants.

14. The computer-implemented business practice management method according to claim 6, wherein said Business Tools module further comprises an email Listener module, and said steps further comprise said email Listener module interpreting the subject line of emails for indexing and abstracting any attached documents.

15. The computer-implemented business practice management method according to claim 10, further comprising a step of all of said participants sharing said Business Tools module via said communication layer, in accordance with the participant's assigned permissions level.

16. The computer-implemented business practice management method according to claim 12, further comprising a step of said Loss Mitigation Module guiding the user through a loss mitigation settlement by displaying a series of forms containing a series of questions to be asked of a borrower all relating to various loss mitigation solutions, various borrower reasons for not repaying a loan, and provides a data entry capability for recording answers.

17. The computer-implemented business practice management method according to claim 16, further comprising a step of said Business Processes Module allowing said user to record answers to said series of questions asked of said borrower and updates said database with said recorded answers.

* * * * *